United States Patent
Jiang et al.

(10) Patent No.: US 10,049,328 B2
(45) Date of Patent: Aug. 14, 2018

(54) GROUP DRIVING STYLE LEARNING FRAMEWORK FOR AUTONOMOUS VEHICLES

(71) Applicant: Baidu USA LLC, Sunnyvale, CA (US)

(72) Inventors: Yifei Jiang, Sunnyvale, CA (US); Dong Li, Sunnyvale, CA (US); Jiaming Tao, Sunnyvale, CA (US); Jiangtao Hu, Sunnyvale, CA (US); Liyun Li, Sunnyvale, CA (US); Guang Yang, Sunnyvale, CA (US); Jingao Wang, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 0 days.

(21) Appl. No.: 15/292,970

(22) Filed: Oct. 13, 2016

(65) Prior Publication Data
US 2018/0107942 A1 Apr. 19, 2018

(51) Int. Cl.
*G06N 99/00* (2010.01)
*G05D 1/00* (2006.01)

(52) U.S. Cl.
CPC ......... *G06N 99/005* (2013.01); *G05D 1/0011* (2013.01); *G05D 1/0088* (2013.01)

(58) Field of Classification Search
CPC ... G06N 99/005; G05D 1/0011; G05D 1/0088
See application file for complete search history.

(56) References Cited

U.S. PATENT DOCUMENTS

2017/0270789 A1* 9/2017 Ferguson ......... G08G 1/096816

* cited by examiner

*Primary Examiner* — Basil T. Jos
(74) *Attorney, Agent, or Firm* — Womble Bond Dickinson (US) LLP

(57) ABSTRACT

A social driving style learning framework or system for autonomous vehicles is utilized, which can dynamically learn the social driving styles from surrounding vehicles and adopt the driving style as needed. Each of the autonomous vehicles within a particular driving area is equipped with the driving style learning system to perceive the driving behaviors of the surrounding vehicles to derive a set of driving style elements. Each autonomous vehicle transmits the driving style elements to a centralized remote server. The server aggregates the driving style elements collected from the autonomous vehicles to determine a driving style corresponding to that particular driving area. The server transmits the driving style back to each of the autonomous vehicles. The autonomous vehicles can then decide whether to adopt the driving style, for example, to follow the traffic flow with the rest of the vehicles nearby.

24 Claims, 10 Drawing Sheets

GROUP DRIVING STYLE LEARNING FRAMEWORK FOR AUTONOMOUS VEHICLES

TECHNICAL FIELD

Embodiments of the present invention relate generally to operating autonomous vehicles. More particularly, embodiments of the invention relate to determining driving styles of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Group driving styles, relatively stable part of group driving behaviors at the strategic, tactical, and operational levels, varies in different areas due to local social norms and cultural values, surrounding environments and traffic conditions, and local weather. For example, in suburban areas, people's driving styles are more on a defensive driving side and in urban areas people are more on an aggressive driving side. In addition, people drive more cautiously in a raining day than usual.

An autonomous vehicle (also referred to as an autonomous driving vehicle or ADV) needs to adopt local driving styles (or similar ones) to keep the traffic flow harmonious, and to make a trip safe and time efficient. For example, an autonomous vehicle may take a much longer time to complete a trip if a very defensive driving strategy is adopted in an urban area because most of vehicles are more on an aggressive driving side, as they may cut in frequently. Alternatively, an autonomous vehicle may have a higher risk of an accident if an aggressive driving style is used in a raining day as all surrounding vehicles are driving cautiously and slowly. A social driving style has many aspects and may change dynamically thus it is hard to preconfigure a set of rules for that in an autonomous vehicle.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
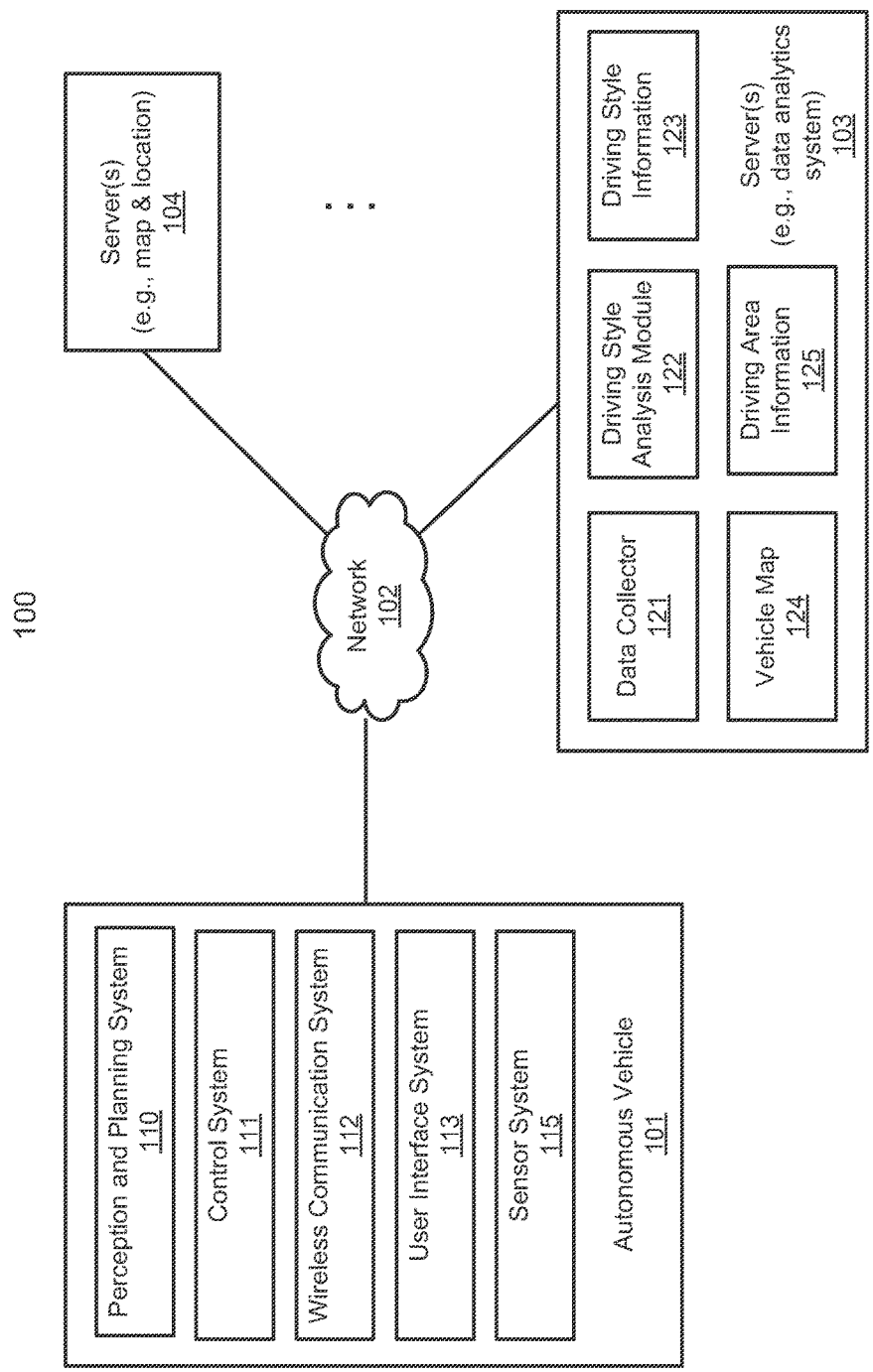
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, a social driving style learning framework or system for autonomous vehicles is utilized, which can dynamically learn the social driving styles from surrounding vehicles and adopt the driving style as needed. Each of the autonomous vehicles within a particular driving area is equipped with a driving style learning or adoption system to perceive and observe the driving behaviors of the surrounding vehicles to derive a set of driving style elements. Each autonomous vehicle transmits or reports the driving style elements to a centralized remote server (e.g., a cloud server) over a network. The server aggregates the driving style elements collected from the autonomous vehicles to determine a driving style corresponding to that particular driving area. The server then transmits the driving style back to each of the autonomous vehicles that are located within the corresponding driving area. The autonomous vehicles can then decide whether to adopt the driving style, for example, to follow the traffic flow with the rest of the vehicles nearby.

In one embodiment, an autonomous vehicle perceives driving behaviors of the vehicles surrounding the autonomous vehicle. Driving style elements for each of the surrounding vehicles are determined based on its driving behavior. The autonomous vehicle transmits the driving style elements to a centralized remote server over a network. The remote server is communicatively coupled to many autonomous vehicles and receives driving style elements from each of the autonomous vehicles about the driving behaviors of its surrounding vehicles. The autonomous vehicle receives a driving style from the remote server, which determines a driving style based on the received driving style elements collected from one or more other autonomous vehicles nearby. Based on the received driving style, the autonomous vehicle plans and generates planning and control data to control and drive the autonomous vehicle. As a result, the autonomous vehicle can adopt a driving style similar to other vehicles nearby and to follow the traffic flow smoothly.

According to another aspect of the invention, instead of sending the driving style elements to a centralized server, the autonomous vehicles that are located within a predetermined proximity or driving area may exchange the driving style elements over a wireless network (e.g., a wireless local area network or WLAN) to allow each of the autonomous vehicles to determine a driving style itself based on the driving style elements observed by each autonomous vehicle itself and other autonomous vehicles nearby. That is, each autonomous vehicle aggregates the driving style elements observed by all autonomous vehicles in the area to determine a driving style to adopt. This is particularly useful when a network connection to a centralized server is unavailable.

In one embodiment, a first autonomous vehicle observes driving behaviors of one or more vehicles surrounding the first autonomous vehicle. Driving style elements for each of the surrounding vehicles are determined based on a driving behavior of the surrounding vehicle. A first set of driving style elements representing the driving behaviors of the surrounding vehicles is transmitted from the first autonomous vehicle to a second autonomous vehicle over a wireless network. A second set of driving style elements is received from the second autonomous vehicle, where the second set of driving style elements were determined by the second autonomous vehicle based on a perception of driving behaviors of vehicles surrounding the second autonomous vehicle. A driving style is determined based on the first set of driving style elements and the second set of driving style elements. The driving style includes information describing how the first autonomous vehicle should drive in view of the surrounding vehicles at a point in time. The first autonomous vehicle is controlled and driven based on planning and control data generated based on the driving style.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
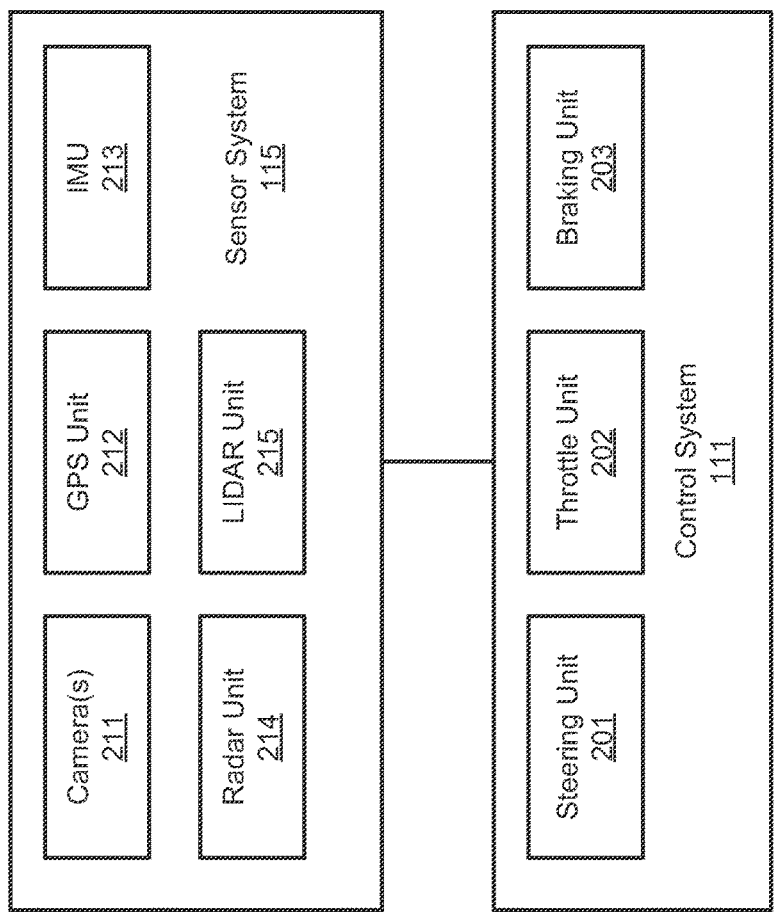
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

During traveling of autonomous vehicle 101 along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Figure 4:
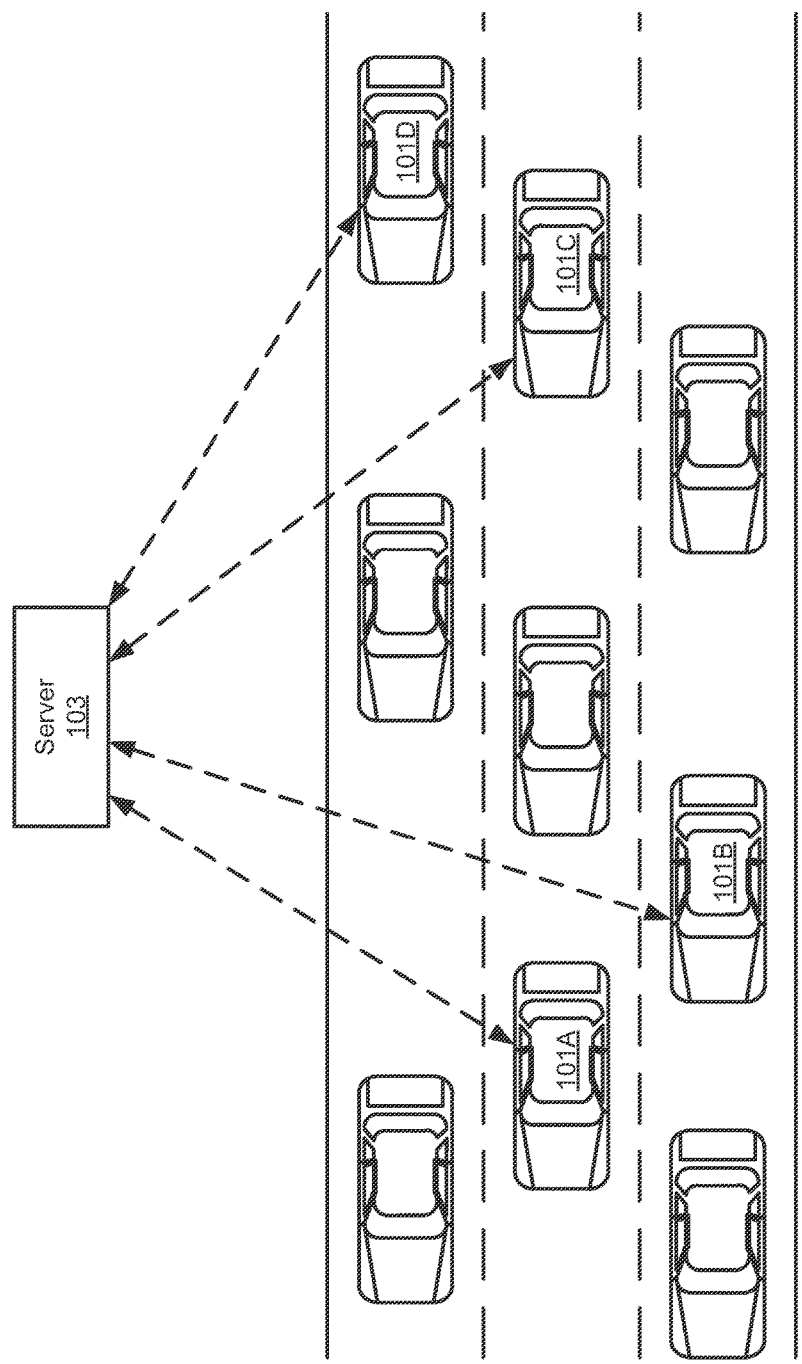
FIG. 4 is a block diagram illustrating an autonomous driving configuration according to one embodiment of the invention.

According to one embodiment, referring back to FIG. 1, each of autonomous vehicles, such as, autonomous vehicle 101, perceives driving behaviors of the surrounding vehicles, determines driving style elements representing the driving behaviors, and transmits the driving style elements to a centralized server over network 102, in this example, server 103 operating as a data analytics server, as shown in FIG. 4. Referring now to FIG. 4, it shows a particular driving area or driving region 400 that has been previously defined. In this driving area, there are many vehicles travelling within driving area 400, including autonomous vehicles 101A-101D and other human-driving vehicles.

In one embodiment, each of autonomous vehicles 101A-101D are communicatively coupled to centralized server 103 over a network. For example, each of autonomous vehicles 101A-101D may be communicatively coupled to one or more cellular towers, basestations, or WiFi hot spots, which are in turn coupled to centralized server 103. According to one embodiment, based on the driving elements receive from autonomous vehicles 101A-101D, server 103 determines a driving style representing the driving style of all vehicles travelling within driving area 400 at the point in time. Server 103 then transmits the driving style back to autonomous vehicles 101A-101D, provided autonomous vehicles 101A-101D are still located within driving area 400. As a result, autonomous vehicles 101A-101D can adopt to the driving style when planning the next driving or moving cycle.

Referring back to FIG. 1, in one embodiment, server 103 includes data collector 121 and driving style analysis module 122. Data collector 121 collects all the driving style elements from all the autonomous vehicles that are communicatively coupled to server 103. The driving style elements may be stored as a part of driving style information 123 in a persistent storage device such as hard disks. A driving style element may refer to a driving speed of a vehicle, a distance between two vehicles, a deceleration rate of a vehicle, or a distance for deceleration (from deceleration to complete stop). A driving style element may further refer to a frequency of changing lanes, a speed of changing lanes, or a turning angle of changing lanes.

In addition to the driving style elements, data collector 121 further receives the locations of each autonomous vehicle sending the driving style elements, as well as locations of their surrounding vehicles. Server 103 may further maintain vehicle map 124 indicating the locations of the vehicles involved.

In one embodiment, analysis module 122 performs an analysis on driving style information 123 to determine a driving style of a particular driving area, which may be defined as a part of driving area information 125. A driving area may be a city, a block of a city, a block of a suburban, a segment of a highway, or an intersection, etc. For each of the driving areas, analysis module 122 identifies the driving style elements of the vehicles that are located within the driving area, performs an analysis on the driving style elements, and determines a driving style based on the analysis for that driving area. Analysis module 122 then identifies the autonomous vehicles that are located within the corresponding driving area based on vehicle map 124. Analysis module 122 then transmits the driving style to the autonomous vehicles that are still located within the driving area at the point in time.

In one embodiment, a driving style may include some or all of the driving style elements described above that represent all of the vehicles travelling within the driving area, such as, for example, averaged driving style elements. For example, a driving style may refer to an averaged driving speed of vehicles, an averaged distance amongst the vehicles, an averaged deceleration rate of vehicles, an averaged distance for deceleration (e.g., from deceleration to complete stop), an averaged frequency of changing lanes, an averaged speed of changing lanes, or an averaged turning angle of changing lanes.

Note that when autonomous vehicle 101 transmits driving style elements to server 103, it may be in a first driving area. Thus, the driving style elements represent the driving behaviors of the vehicles located within the first driving area at the time. However, when server 103 determines the driving style for the first driving area and is ready to transmit the driving style of the first driving area, autonomous vehicle 101 may be in a second driving area. Thus, autonomous vehicle 101 may not receive the driving style for the first driving area. Rather, autonomous vehicle 101 may receive the driving style for the second driving area. The second driving style for the second driving area may be determined based on the driving style elements submitted by other autonomous vehicles located within the second driving area.

Figure 3:
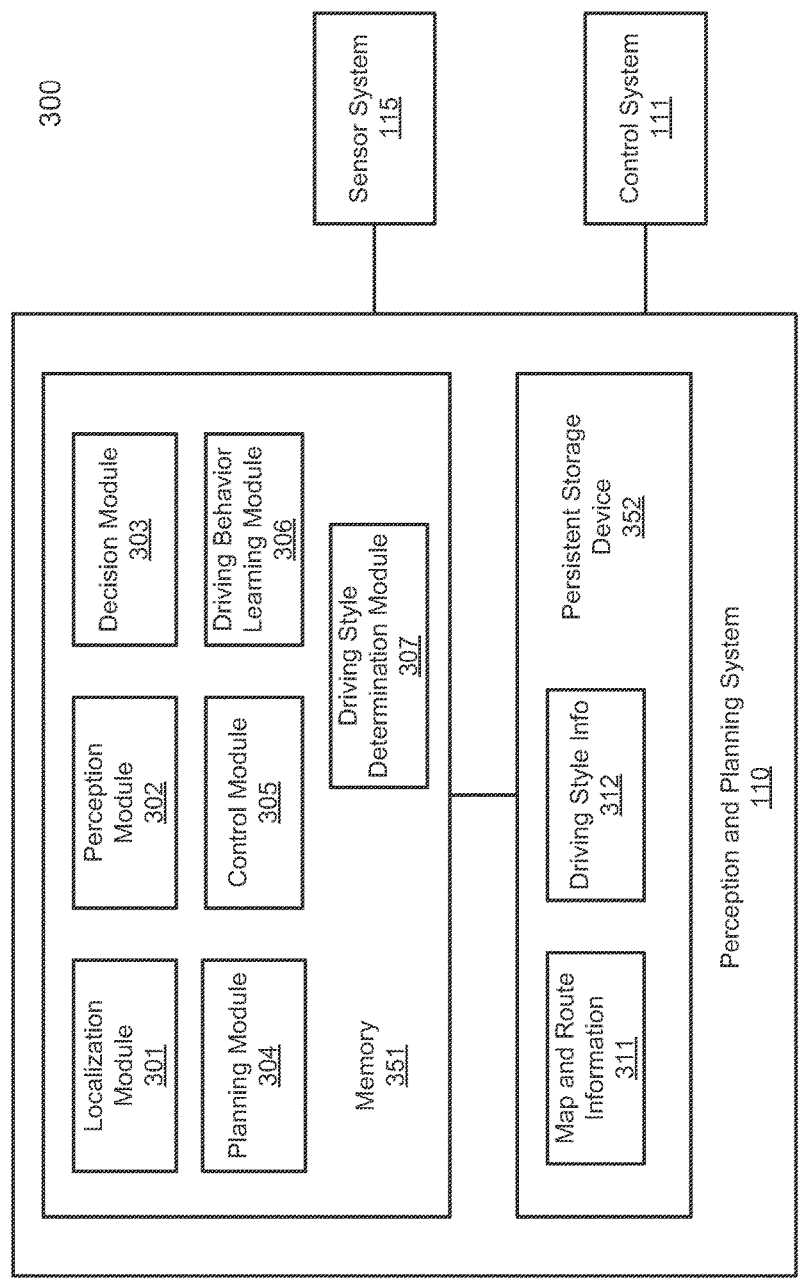
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, driving behavior learning module 306, and driving style determination module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. During traveling of autonomous vehicle 300 along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, referring back to FIG. 3, in making a decision, decision module 303 invokes driving behavior learning module 306 to learn and observe the driving behaviors of surrounding vehicles. The driving behavior of a vehicle refers to an average speed, acceleration rate, deceleration rate, how close the vehicle follows another vehicle ahead, how often it changes lanes, how fast it changes lanes, how sharp a turning angle is when changing lanes, etc. Based on the driving behaviors learned by driving behavior learning module 306, driving style determination module 307 determines a list of one or more driving style elements for each of the surrounding vehicles that may affect changing lanes of autonomous vehicle 300.

A vehicle that may affect changing lanes of vehicle 300 may be a vehicle moving within a current lane from which vehicle 300 attempts to change (e.g., an ahead vehicle, a tailgating vehicle), a vehicle moving into a target lane to which vehicle 300 attempt to change, or any other vehicles that are within a predetermined proximity (e.g., a corresponding driving area) with respect to vehicle 300. A driving style element may refer to a driving speed of a vehicle, a distance between two vehicles, a deceleration rate of a vehicle, or a distance for deceleration (from deceleration to complete stop). A driving style element may further refer to a frequency of changing lanes, a speed of changing lanes, or a turning angle of changing lanes. The information regarding the driving behaviors and/or driving style elements may be stored in persistent storage device 352 as a part of driving style information 312.

Once the driving style elements have been extracted from the perceived driving behaviors, driving style determination module 307 transmits the driving style elements to a remote server over a network. The remote server may be a part of server 103 of FIG. 1. The remote server collects the driving style elements from a number of vehicles that are located within the same driving area with respect to vehicle 300. The remote server determines a driving style for the driving area based on the driving style elements received from various vehicles moving within the driving areas. In one embodiment, the remote server may calculate an averaged value from each type of driving style elements received from various vehicles. In one embodiment, information of a driving style may refer to an average speed, an average frequency of changing lanes, an average distance between two vehicles moving in the same lane, an average acceleration rate, an average deceleration rate, and/or an average angle of changing lanes of vehicles that are located within the targeted driving area.

Figure 5:
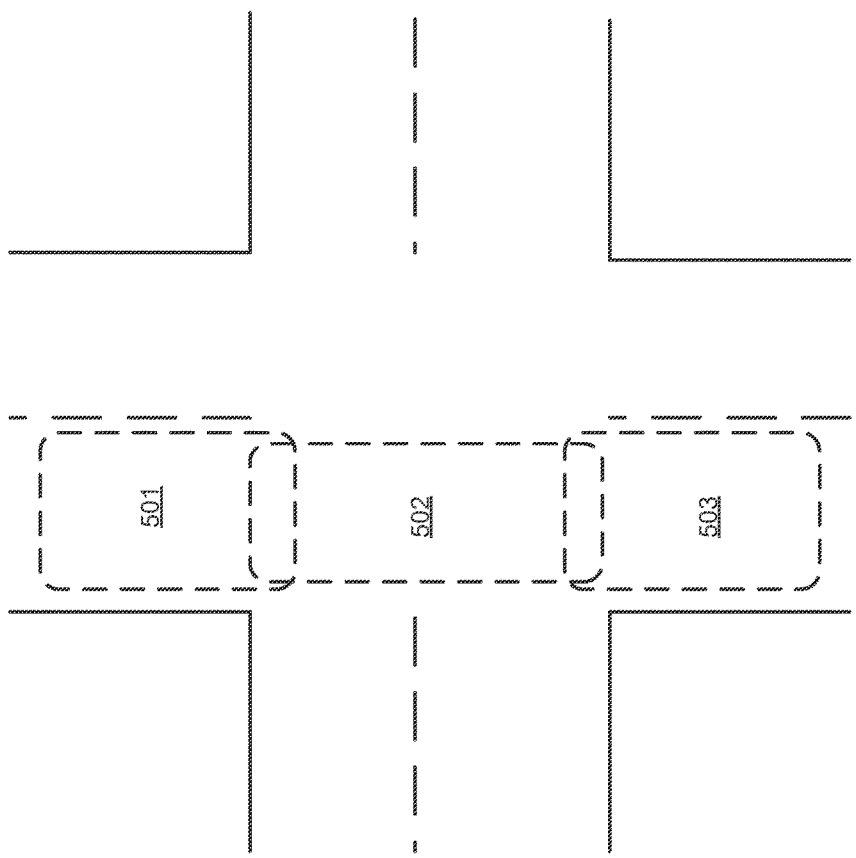
FIG. 5 is a block diagram illustrating an autonomous driving configuration according to another embodiment of the invention.

Once the driving style has been determined, the remote server transmits over the network the information concerning the driving style to the vehicles that are located within the corresponding driving area. Note that a vehicle may be located in different driving areas between the time of transmitting driving style elements to the remote server and the time of receiving a driving style from the remote server. For example, as shown in FIG. 5, when autonomous vehicle 300 transmits driving style elements to the remote server, vehicle 300 may be in driving area 501 at the time. Thus, the driving style elements represent the driving behaviors of the vehicles located within the first driving area at the time. However, when the remote server determines the driving style for the first driving area and is ready to transmit the driving style of the first driving area, autonomous vehicle 300 may be in driving area 502 or driving area 503 as vehicle 300 is moving. Thus, autonomous vehicle 300 may not receive the driving style for driving area 501. Rather, autonomous vehicle 300 may receive a second driving style for driving area 502 or driving area 503. The second driving style for second driving area 502 or driving area 503 may be determined based on the driving style elements submitted by other autonomous vehicles.

Assuming vehicle 300 is still located within the same driving area, driving style determination module 307 receives the driving style from the remote server. In response to the driving style provided by driving style determination module 307, decision module 303 makes a decision of adopting the driving style and planning module 304 generates planning and control data based on the decision or decisions of decision module 303. Based on the planning and control data, control module 305 controls and drives autonomous vehicle 300 accordingly.

Figure 6:
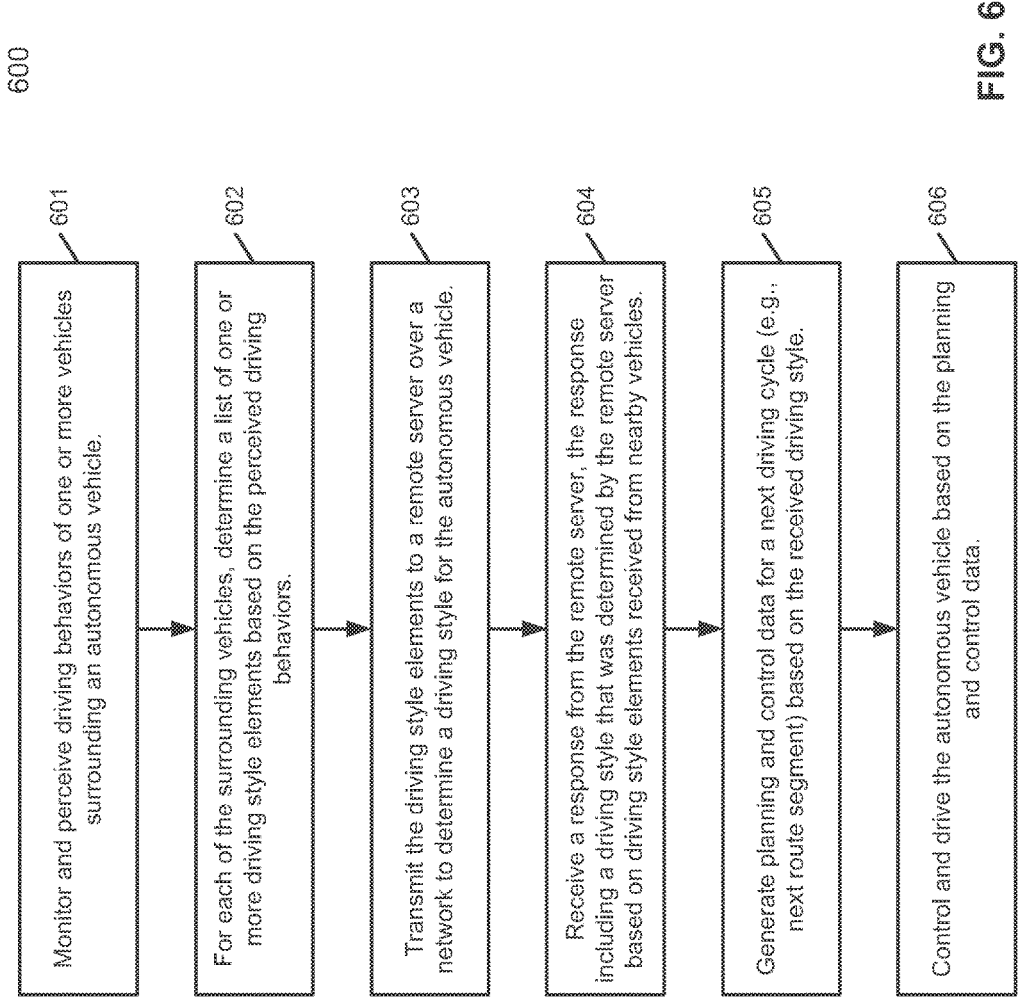
FIG. 6 is a flow diagram illustrating a process of operating an autonomous vehicle according one embodiment of the invention.

FIG. 6 is a flow diagram illustrating a process of operating an autonomous vehicle according one embodiment of the invention. Process 600 may be performed by processing logic which may include software, hardware, or a combination thereof. For example, process 600 may be performed by perception and planning system 110 of FIG. 3. Referring to FIG. 6, at block 601, processing logic monitors and perceives driving behaviors of one or more vehicles surrounding an autonomous vehicle. The surrounding vehicles are within a predetermined proximity or driving area with respect to the autonomous vehicle. At block 602, for each of the surrounding vehicles, processing logic determines a list of one or more driving style elements based on the perceived driving behaviors. At block 603, the driving style elements are transmitted to a remote server over a network to allow the remote server to determine a driving style corresponding to the driving area. At block 604, a response is received from the remote server. The response includes a driving style determined by the remote server based on the driving style elements collected from various vehicles. At block 605, planning and control data is generated for a next driving cycle (e.g., next route segment) based in part on the driving style to adopt the driving style of the driving area. At block 606, the autonomous vehicle is controlled and driven based on the planning and control data.

Figure 7:
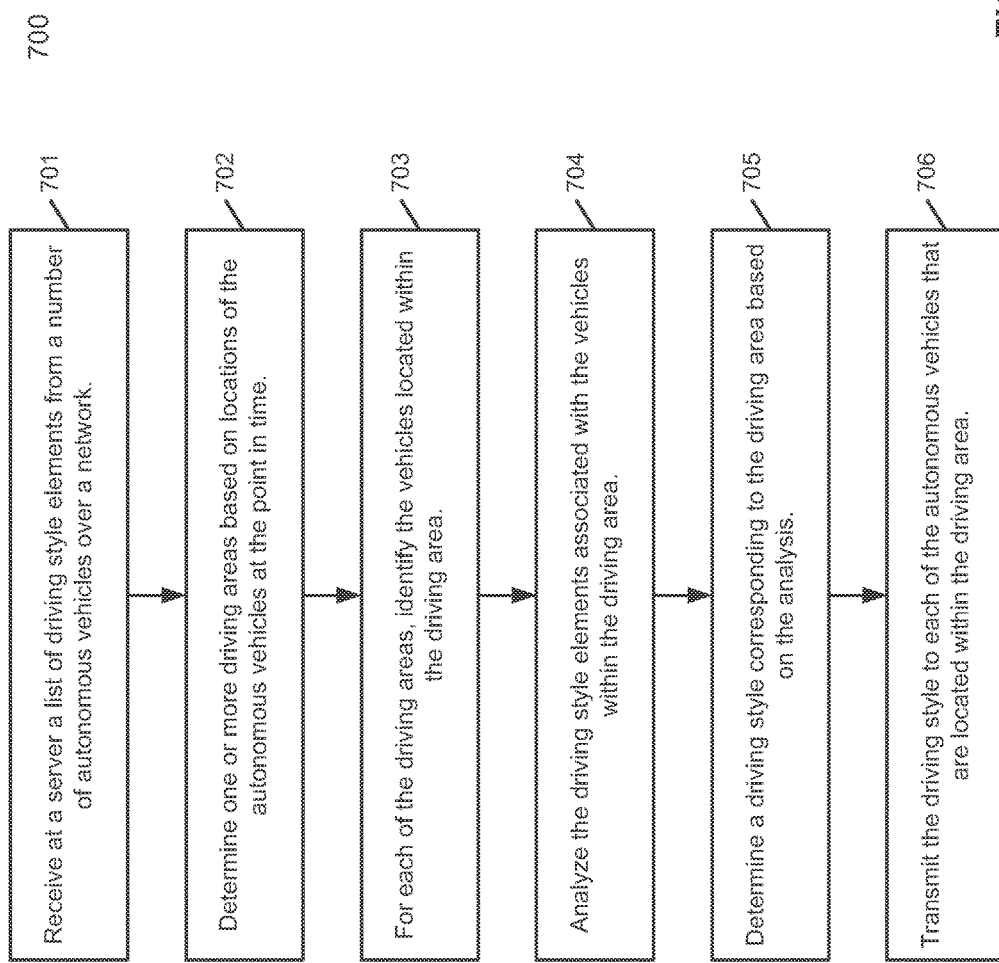
FIG. 7 is a flow diagram illustrating a process of determining driving styles for operating autonomous vehicles according one embodiment of the invention.

FIG. 7 is a flow diagram illustrating a process of determining driving styles for operating autonomous vehicles according one embodiment of the invention. Process 700 may be performed by processing logic which may include software, hardware, or a combination thereof. For example, process 700 may be performed by data analytics system or server 103 of FIG. 3. Referring to FIG. 7, at block 701, processing logic receives driving style elements from a number of autonomous vehicles over a network. At block 702, processing logic determines one or more driving areas based on the locations of the autonomous vehicles. At block 703, for each of the driving areas, processing logic identifies one or more vehicles that are located within the driving area. At block 704, processing logic analyzes the driving style elements associated with the vehicles within the driving area. At block 705, processing logic determines a driving style for the driving area based on the analysis. At block 706, processing logic transmits the driving style to each of the autonomous vehicles located in the driving area at the point in time. Processing logic optionally stores the driving styles for various driving areas in a database for future usage. The historic driving styles of a driving area may be utilized to determine future driving styles for the same or similar driving area.

The techniques described above require an autonomous vehicle transmitting the driving style elements to a centralized server over a network such as a cloud network. In some situations, such a network connection may be unavailable. For example, if a vehicle is travelling in a city, certain wireless signals (e.g., cellular signals) may be blocked by the tall buildings. Similarly, when a vehicle is travelling in a suburban area, there may not be a cellular tower or basestation available either. As a result, the centralized server may not be utilized appropriately.

According to one embodiment, when an autonomous vehicle detects that a network connection with a remote server is unavailable, the autonomous vehicle may communicate with other vehicles nearby over a wireless local area network to exchange the driving style elements. The autonomous vehicle then determines the driving style based on the exchanged driving style elements and adopts the driving style accordingly. That is, instead of centrally determining a driving style for a driving area at a remote server, each autonomous vehicle can determine the driving style based on the driving style elements exchanged with other nearby autonomous vehicles.

Figure 8:
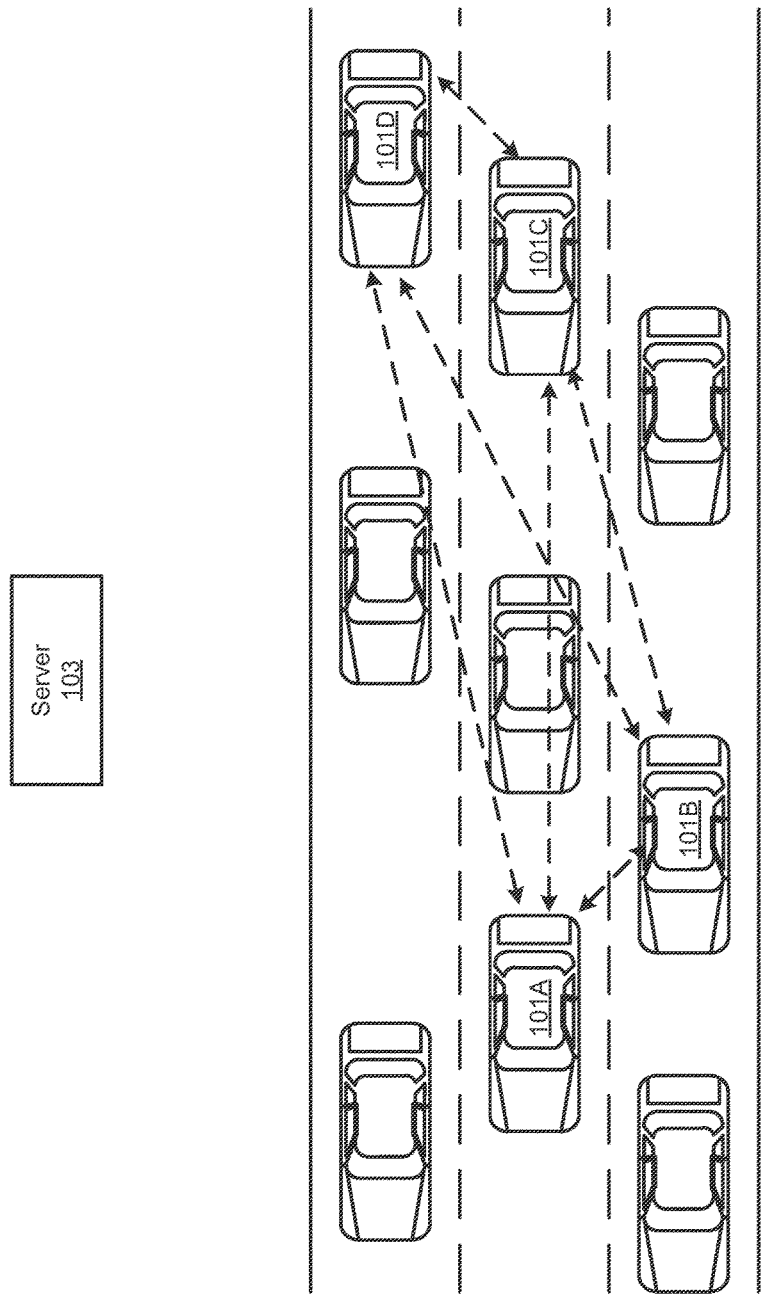
FIG. 8 is a block diagram illustrating an autonomous driving configuration according to another embodiment of the invention.

Referring now to FIG. 8, in this example, a network connection to remote server 103 is unavailable. Each of autonomous vehicles 101A-101D maintains a local network connection each the rest of the autonomous vehicles within a particular driving area represented by FIG. 8. When deciding a next moving cycle, each of autonomous vehicles 101A-101D perceives driving behaviors of the surrounding vehicles and determines driving style elements based on the driving behaviors. Each of autonomous vehicles 101A-101D then exchanges the driving style elements with the rest of the autonomous vehicles in the driving area. Based on the exchanged driving style elements, at least one of autonomous vehicles 101A-101D determines the driving style and adopts the driving style in deciding the next moving cycle.

For example, when autonomous vehicle 101A detects that a network connection with sever 103 is unavailable, autonomous vehicle 101A communicates with other autonomous vehicles in the driving area such as autonomous vehicles 101B-101D to establish a WLAN connection. Autonomous vehicle 101A then transmits a first set of driving style elements concerning driving behaviors of its surrounding vehicles to autonomous vehicles 101B-101D to exchange a second set, a third set, and a fourth set of driving style elements of vehicles surrounding autonomous vehicles 101B-101D, respectively. Autonomous vehicle 101A then aggregates at least some of the first set, second set, third set, and fourth set of driving style elements to determine a driving style. Autonomous vehicle 101A then adopts the driving style in deciding a next moving cycle.

Figure 9:
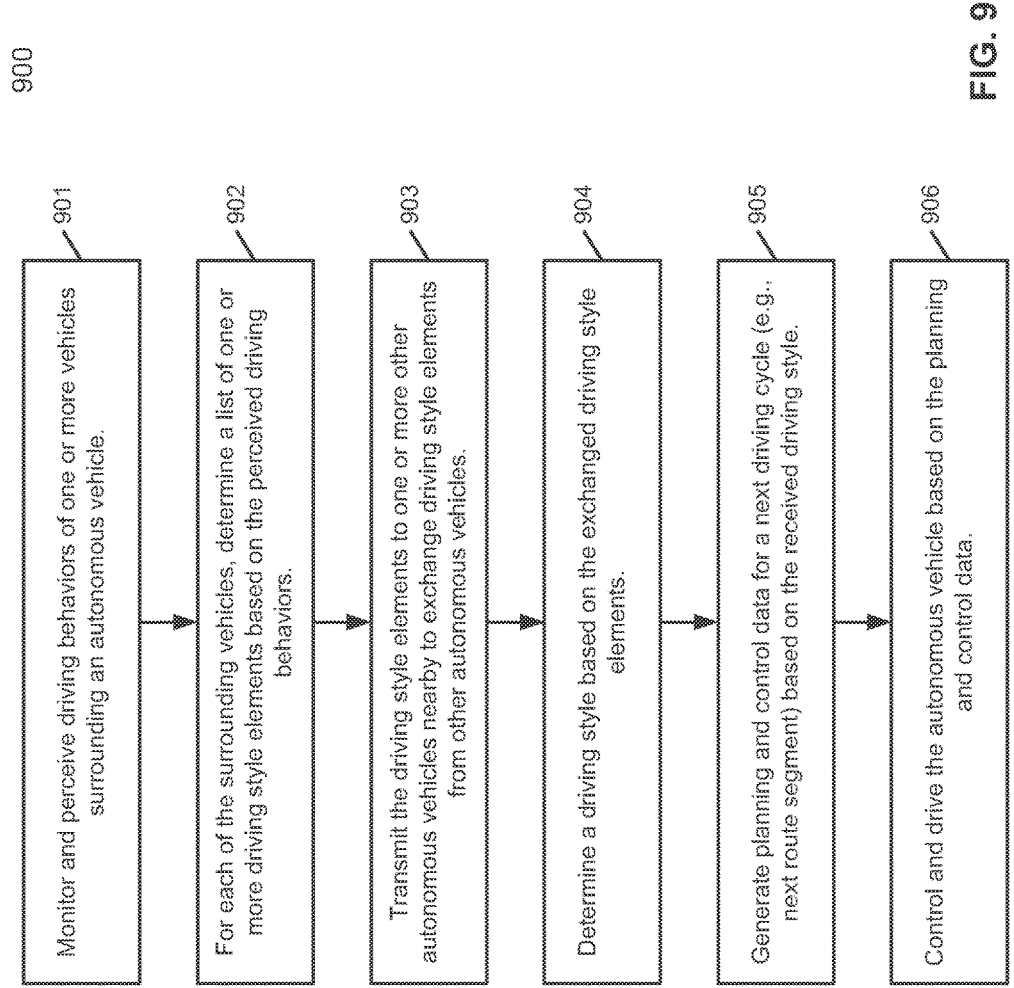
FIG. 9 is a flow diagram illustrating a process of operating an autonomous vehicle according one embodiment of the invention.

FIG. 9 is a flow diagram illustrating a process of operating an autonomous vehicle according one embodiment of the invention. Process 900 may be performed by processing logic which may include software, hardware, or a combination thereof. For example, process 900 may be performed by perception and planning system 110 of FIG. 3. Referring to FIG. 9, at block 901, processing logic monitors and perceives driving behaviors of vehicles surrounding an autonomous vehicle. At block 902, for each of the surrounding vehicles, processing logic determines a list of driving style elements based on the perceived driving behaviors. At block 903, processing logic transmits the driving style elements to one or more other autonomous vehicles in the driving area to exchange the driving style elements generated by those autonomous vehicles. At block 904, processing logic aggregates the driving style elements that were generated by itself and received from other autonomous vehicles in the driving area. A driving style is then determined based on the aggregated driving style elements. At block 905, processing logic generates planning and control data based in part on the driving style. At block 906, the autonomous vehicle is controlled and driven based on the planning and control data.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
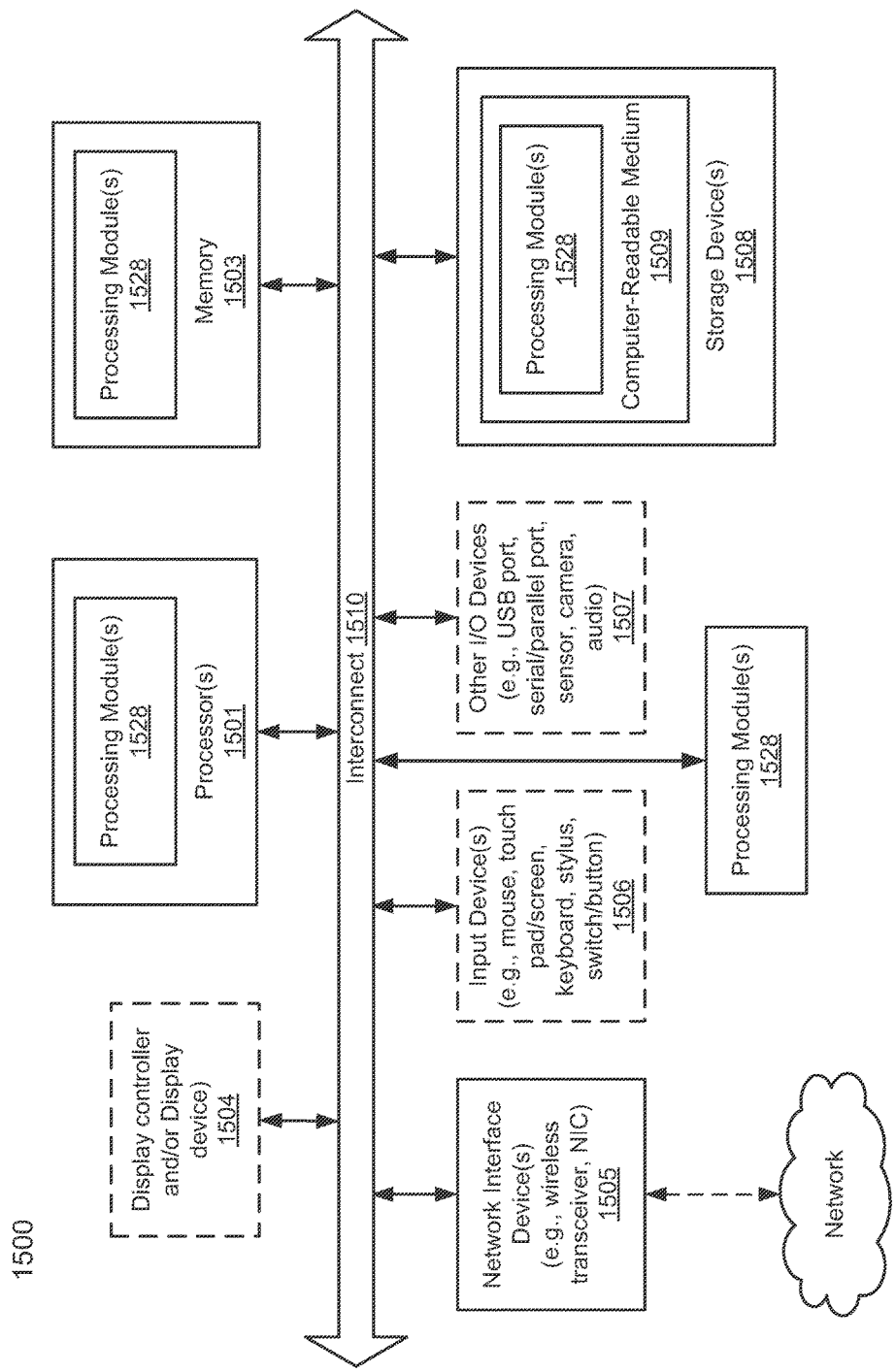
FIG. 10 is a block diagram illustrating a data processing system according to one embodiment.

FIG. 10 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, driving style analysis module 122, driving style determination 307, or driving behavior learning module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the perception and planning arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous vehicle, the method comprising:
   perceiving driving behaviors of one or more vehicles surrounding a first autonomous vehicle;
   transmitting one or more driving style elements representing the driving behaviors of the surrounding vehicles from the first autonomous vehicle to a remote server over a network;
   receiving from the remote server a driving style that was determined based on the driving style elements at the remote server, the driving style including information describing how the first autonomous vehicle should drive in view of the surrounding vehicles at a point in time;
   generating planning and control data based on the driving style; and
   controlling and driving the first autonomous vehicle based on the planning and control data.

2. The method of claim 1, wherein the remote server receives a plurality of driving style elements from a plurality of autonomous vehicles over the network, and wherein the driving style received from the remote server was determined based on driving style elements of one or more autonomous vehicles located within a predetermined proximity of the first autonomous vehicle.

3. The method of claim 1, further comprising transmitting a location of each of the surrounding vehicles to the remote server over the network, wherein the remote server determines the driving style based on the driving style elements of one or more vehicles that are within a predetermined proximity of the first autonomous vehicle based on the locations of the surrounding vehicles.

4. The method of claim 1, wherein the driving style elements associated with the surrounding vehicles comprise at least one of a driving speed of each surrounding vehicle, distances between the surrounding vehicles, a deceleration rate, and a distance of deceleration.

5. The method of claim 4, wherein the driving style elements further comprise at least one of a frequency of changing lanes, a speed of changing lanes, and a turning angle of changing lanes.

6. The method of claim 1, further comprising:
   detecting that a network connection with the remote server is unavailable;

in response to the detection, exchanging the driving style elements with one or more autonomous vehicles located within a predetermined proximity of the first autonomous vehicle; and determining the driving style based on the exchanged driving style elements within the first autonomous vehicles.

7. The method of claim 6, wherein exchanging the driving style elements with one or more autonomous vehicles comprises:

detecting that a second autonomous vehicle is located within the predetermined proximity of the first autonomous vehicle;

transmitting the driving style elements as a first set of driving style elements to the second autonomous vehicle over a wireless connection;

receiving a second set of driving style elements from the second autonomous vehicle, wherein the driving style is determined based on the first set of driving style elements and the second set of driving style elements.

8. A non-transitory machine-readable medium having instructions stored therein, which when executed by a processor, cause the processor to perform operations of operating an autonomous vehicle, the operations comprising:

perceiving driving behaviors of one or more vehicles surrounding a first autonomous vehicle;

transmitting one or more driving style elements representing the driving behaviors of the surrounding vehicles from the first autonomous vehicle to a remote server over a network;

receiving from the remote server a driving style that was determined based on the driving style elements at the remote server, the driving style including information describing how the first autonomous vehicle should drive in view of the surrounding vehicles at a point in time;

generating planning and control data based on the driving style; and controlling and driving the first autonomous vehicle based on the planning and control data.

9. The machine-readable medium of claim 8, wherein the remote server receives a plurality of driving style elements from a plurality of autonomous vehicles over the network, and wherein the driving style received from the remote server was determined based on driving style elements of one or more autonomous vehicles located within a predetermined proximity of the first autonomous vehicle.

10. The machine-readable medium of claim 8, wherein the operations further comprise transmitting a location of each of the surrounding vehicles to the remote server over the network, wherein the remote server determines the driving style based on the driving style elements of one or more vehicles that are within a predetermined proximity of the first autonomous vehicle based on the locations of the surrounding vehicles.

11. The machine-readable medium of claim 8, wherein the driving style elements associated with the surrounding vehicles comprise at least one of a driving speed of each surrounding vehicle, distances between the surrounding vehicles, a deceleration rate, and a distance of deceleration.

12. The machine-readable medium of claim 11, wherein the driving style elements further comprise at least one of a frequency of changing lanes, a speed of changing lanes, and a turning angle of changing lanes.

13. The machine-readable medium of claim 8, wherein the operations further comprise:

detecting that a network connection with the remote server is unavailable;

in response to the detection, exchanging the driving style elements with one or more autonomous vehicles located within a predetermined proximity of the first autonomous vehicle; and determining the driving style based on the exchanged driving style elements within the first autonomous vehicles.

14. The machine-readable medium of claim 13, wherein exchanging the driving style elements with one or more autonomous vehicles comprises:

detecting that a second autonomous vehicle is located within the predetermined proximity of the first autonomous vehicle;

transmitting the driving style elements as a first set of driving style elements to the second autonomous vehicle over a wireless connection;

receiving a second set of driving style elements from the second autonomous vehicle, wherein the driving style is determined based on the first set of driving style elements and the second set of driving style elements.

15. A perception and planning system, comprising:

a processor; and a memory coupled to the processor to store instructions, which when executed by the processor, cause the processor to perform operations of operating an autonomous vehicle, the operations including perceiving driving behaviors of one or more vehicles surrounding a first autonomous vehicle, transmitting one or more driving style elements representing the driving behaviors of the surrounding vehicles from the first autonomous vehicle to a remote server over a network, receiving from the remote server a driving style that was determined based on the driving style elements at the remote server, the driving style including information describing how the first autonomous vehicle should drive in view of the surrounding vehicles at a point in time, generating planning and control data based on the driving style, and controlling and driving the first autonomous vehicle based on the planning and control data.

16. The system of claim 15, wherein the remote server receives a plurality of driving style elements from a plurality of autonomous vehicles over the network, and wherein the driving style received from the remote server was determined based on driving style elements of one or more autonomous vehicles located within a predetermined proximity of the first autonomous vehicle.

17. The system of claim 15, wherein the operations further comprise transmitting a location of each of the surrounding vehicles to the remote server over the network, wherein the remote server determines the driving style based on the driving style elements of one or more vehicles that are within a predetermined proximity of the first autonomous vehicle based on the locations of the surrounding vehicles.

18. The system of claim 15, wherein the driving style elements associated with the surrounding vehicles comprise at least one of a driving speed of each surrounding vehicle, distances between the surrounding vehicles, a deceleration rate, and a distance of deceleration.

19. The system of claim 18, wherein the driving style elements further comprise at least one of a frequency of changing lanes, a speed of changing lanes, and a turning angle of changing lanes.

20. A computer-implemented method for operating an autonomous vehicle, the method comprising:
- perceiving by a first autonomous vehicle driving behaviors of one or more vehicles surrounding the first autonomous vehicle;
- determining a plurality of driving style elements for each of the surrounding vehicles based on a driving behavior of the surrounding vehicle;
- transmitting a first set of driving style elements representing the driving behaviors of the surrounding vehicles from the first autonomous vehicle to a second autonomous vehicle over a wireless network;
- receiving a second set of driving style elements from the second autonomous vehicle, wherein the second set of driving style elements were determined by the second autonomous vehicle based on a perception of driving behaviors of vehicles surrounding the second autonomous vehicle;
- determining a driving style based on the first set of driving style elements and the second set of driving style elements, wherein the driving style includes information describing how the first autonomous vehicle should drive in view of the surrounding vehicles at a point in time; and
- controlling and driving the first autonomous vehicle based on planning and control data generated based on the driving style.

21. The method of claim 20, wherein the first autonomous vehicle and the second autonomous vehicle are located within a predetermined proximity at the point in time.

22. The method of claim 20, further comprising transmitting a location of each of the surrounding vehicles to the second autonomous vehicle, wherein the second set of driving style elements further includes a location of each of the surrounding vehicles.

23. The method of claim 20, wherein the driving style elements associated with the surrounding vehicles comprise at least one of a driving speed of each surrounding vehicle, distances between the surrounding vehicles, a deceleration rate, and a distance of deceleration.

24. The method of claim 23, wherein the driving style elements further comprise at least one of a frequency of changing lanes, a speed of changing lanes, and a turning angle of changing lanes.

* * * * *